United States Patent [19]

McAllister

[11] Patent Number: 4,903,288
[45] Date of Patent: Feb. 20, 1990

[54] RADIATION MONITOR

[75] Inventor: Raymond G. McAllister, Ludlow, England

[73] Assignee: Plantech Radiology Ltd., England

[21] Appl. No.: 163,080

[22] Filed: Mar. 2, 1988

[30] Foreign Application Priority Data

Mar. 4, 1987 [GB] United Kingdom ............... 8705014

[51] Int. Cl.[4] .............................................. H05G 1/28
[52] U.S. Cl. .................................... 378/162; 378/165; 378/182
[58] Field of Search ................ 378/162, 165, 181–188

[56] References Cited

U.S. PATENT DOCUMENTS

| | | | |
|---|---|---|---|
| 3,703,272 | 11/1972 | Lareau | 378/187 |
| 4,070,582 | 1/1978 | Kisrow | 378/181 |
| 4,248,172 | 2/1981 | Krobel et al. | 378/182 |
| 4,394,772 | 7/1983 | Okamoto et al. | 378/182 |

FOREIGN PATENT DOCUMENTS

| | | | |
|---|---|---|---|
| 2812929 | 10/1979 | Fed. Rep. of Germany | 378/182 |
| 0146246 | 9/1982 | Japan | 378/182 |

*Primary Examiner*—Craig E. Church
*Assistant Examiner*—John C. Freeman

*Attorney, Agent, or Firm*—Frijouf, Rust & Pyle

[57] ABSTRACT

A device for attachment to an X-ray film cassette to indicate whether or not the film has been exposed to X-radiation comprises a phosphor screen (12) which fluoresces on exposure to X-radiation. A photocell (14) detects the light emitted by the screen and generates a control signal which is used to alter the display status of a liquid crystal display (24) from a first condition which indicates that the film in the cassette has not been exposed to X-radiation to a second condition where it indicates that exposure has taken place. A latch circuit (20) is used to retain the altered display even after exposure to X-radiation ceases. The device therefore gives a clear indication of whether or not the film in the cassette has been exposed to X-radiation. The circuit is powered from a nickel cadmium cell (26), the power supply circuit of which incorporates a micro switch (28). The micro-switch is positioned such that when photographic film is present in the cassette and the cassette is closed, the film bears against the microswitch to close the latter, thus allowing power to be supplied to the circuit. In the absence of film, the microswitch (28) is open, as a result of which the liquid crystal display is blank giving a clear indication that there is no film in the cassette.

5 Claims, 1 Drawing Sheet

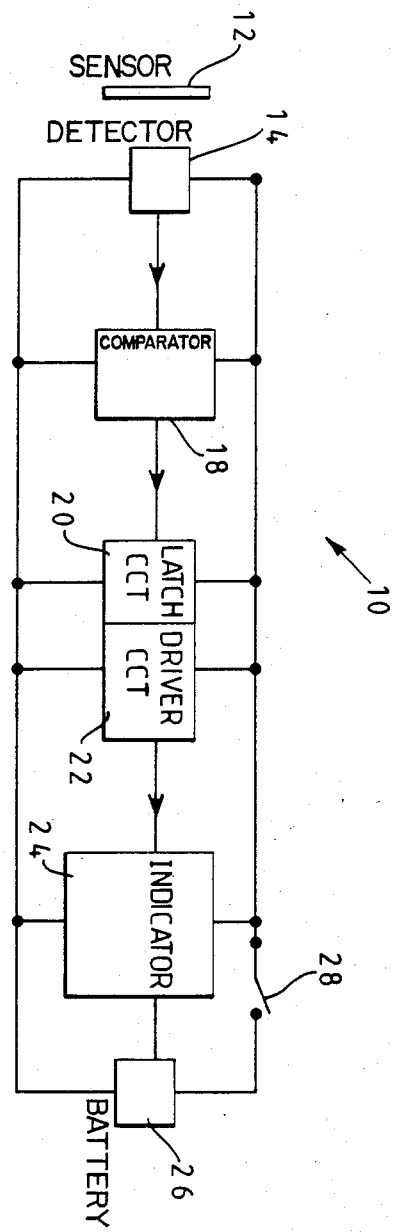

RADIATION MONITOR

The present invention relates to a radiation monitor.

One of the problems associated with the use of X-ray cassettes, for example in hospitals, is that there is no simple way of indicating whether or not the photographic film in the cassette has been exposed to radiation or indeed whether or not there is any film in the cassette.

The present invention seeks to provide a device for indicating whether or not an X-ray cassette has been exposed to X-radiation.

Accordingly the present invention provides a device for indicating whether or not it has been exposed to X-radiation comprising indicator means, means for supplying power to said indicator means and means responsive to the incidence of X-radiation to generate a control signal for altering the status of said indicator means.

The present invention also provides a device for indicating the state of exposure to X-radiation of an X-ray cassette of the type having an outer holder an inner, removable photographic film, the device comprising indicator means; a power supply circuit for supplying power to said indicator means; first means operable in response to the incidence of X-radiation to provide a control signal for altering the status of said indicator means; and switch means in said power supply circuit said switch means being closable in response to the presence of photographic film in said cassette.

The present invention is further described hereinafter, by way of example, with reference to the accompanying drawing, which shows a schematic circuit diagram of a preferred device according to the present invention.

The drawing shows a circuit 10 of a device for use with X-ray film cassettes to indicate whether or not the film has been exposed to X-radiation.

The circuit 10 has a sensor 12 which, when exposed to radiation emits light radiation. Preferably sensor 12 is a small fluorescent screen, typically 1 mm square, of calcium tungstate or any other phosphor and when excited by radiation emits light of wavelength in the red, infra-red, green or blue spectrum. The light is detected by a photosensitive cell 14 and the signal thus generated is compared by comparator 18 with a reference value. The output of the comparator is applied to a latch circuit 20 and power or driver circuit 22. The driver circuit 22 drives a liquid crystal display (LCD) 24 to alter the state of the latter to provide a visual indication that the film has been exposed to radiation. This may be simply the presence of the letter "X" on the display. The latch circuit ensures that the status of the LCD is maintained even after removal of the radiation, i.e. the LCD continues to indicate that the film has been exposed to radiation. As an alternative to or in addition to the LCD, an audible indication can be provided by a suitable acoustic device.

The device is intended to be located on an outer (or inner) surface of the cartridge housing over an existing lead blocking strip or in place of the latter, in which case the device is conveniently provided with a lead backing of typically 1 mm thickness.

The circuit 10 also has a power supply in the form of a battery 26 which is conveniently a nickel cadmium or other cell, a terminal of which is connected to an on/off switch 28.

The switch 28 is conveniently either a pressure micro switch or in the form of a leaf spring. Normally the switch 24 is open. However, the arrangement is such that when a photographic film is inserted into the holder, the photographic film bears against the switch, closing it and supplying power to the LCD 24 from the battery 26. In the unexposed stated, the LCD 20 provides an indication, for example by displaying a symbol such as a spot, that a film is present and has not been exposed to radiation. However, when the cassette is exposed to radiation, the signal applied to the LCD 20 from the photocell 14 indicates that the film has been exposed to radiation.

Finally, when the film is removed to enable the film to be developed, the switch 28 opens, breaking the connection between battery 26 and the LCD 24 and clearing the liquid crystal display, thus indicating the absence of a film. It will be appreciated that more than one switch 28 may be used. When the device is mounted on the inside of the cassette, a hole is provided in the cassette to allow sight of the LCD.

I claim:

1. A device for indicating the state of exposure to x-radiation of an X-ray cassette of the type having an outer holder and an inner, removable photographic film, the device comprising:
   visual indicator means having a first visual state for indicating the presence of unexposed film, a second visual state for indicating the presence of exposed film and a third visual state for indicating the absence of film;
   a power supply circuit for supplying power to said indicator means;
   first means operable in response to the incidence of x-radiation to provide a control signal for altering the status of said indicator means; and
   switch means in said power supply circuit, said switch means being positioned such that in the presence of photographic film in said cassette, said film bears on said switch means to close said switch means.

2. A device as claimed in claim 1 wherein said first means comprises a screen coated with a material which emits radiation of a preselected wavelength on exposure to x-radiation and a sensor for generating a signal in response to said emitted radiation.

3. A device as claimed in claim 1 when said material is a phosphor.

4. A device as claimed in claim 1 when said material is calcium tungstate.

5. A device as claimed in claim 1 wherein said indicator means is operable to provide an audible signal in response to said control signal.

* * * * *